United States Patent [19]

Gniewek

[11] Patent Number: 5,287,459
[45] Date of Patent: Feb. 15, 1994

[54] METHOD AND APPARATUS FOR REDUCING RESPONSE TIME IN AUTOMATED LIBRARY DATA RETRIEVAL SYSTEMS

[75] Inventor: John J. Gniewek, Tucson, Ariz.

[73] Assignee: International Business Machines Corporation, Armonk, N.Y.

[21] Appl. No.: 770,377

[22] Filed: Oct. 3, 1991

[51] Int. Cl.⁵ ............................................ G06F 12/00
[52] U.S. Cl. ................................................... 395/275
[58] Field of Search ................. 395/275, 425; 360/90; 369/34

[56] References Cited

U.S. PATENT DOCUMENTS

| | | | |
|---|---|---|---|
| 4,339,936 | 7/1982 | Pressman | 72/77 |
| 4,435,762 | 4/1984 | Milligan et al. | 395/250 |
| 4,452,406 | 6/1984 | Richard | 242/195 |
| 4,837,690 | 6/1989 | Crockett et al. | 395/325 |
| 4,862,411 | 8/1989 | Dishon et al. | 395/425 |
| 4,876,662 | 10/1989 | Pence | 364/403 |
| 4,945,428 | 7/1990 | Waldo | 360/92 |
| 4,974,156 | 11/1990 | Harding et al. | 395/425 |
| 4,987,533 | 1/1991 | Clark et al. | 395/600 |
| 5,121,683 | 6/1992 | Monehan et al. | 395/275 |
| 5,131,087 | 7/1992 | Warr | 395/425 |
| 5,146,588 | 9/1992 | Crater et al. | 395/575 |
| 5,155,835 | 10/1992 | Belsan | 395/425 |
| 5,155,845 | 10/1992 | Beal et al. | 395/575 |

*Primary Examiner*—Dale M. Shaw
*Assistant Examiner*—D. Dinh
*Attorney, Agent, or Firm*—M. W. Schecter; J. Pershon

[57] ABSTRACT

Access time is improved in a automated library system having sequentially stored data on a recording tape medium. A multiplicity of copies of the data is stored on different tape cartridges. The copies and the original are stored in different areas of the library. Each data segment stored on the tape media copy is stored in different areas of the media length from the original. The multiple copies are created and deleted independent of any user control. The usage of the original and any copies determine the number of copies and their residence times. The library manager selects the tape cartridge that can be retrieved in the shortest response time using the location of the original and the copies, the location on each cartridge of the data requested, the drive and library robot picker availability and the respective queues.

28 Claims, 3 Drawing Sheets

METHOD AND APPARATUS FOR REDUCING RESPONSE TIME IN AUTOMATED LIBRARY DATA RETRIEVAL SYSTEMS

DOCUMENTS INCORPORATED BY REFERENCE

The W. B Harding et al. patent, U.S. Pat. No. 4,974,156, issued on Nov. 27, 1990 and assigned to the assignee of the present invention, to show the management of a data storage hierarchy using optical disk drive library.

The Waldo patent, U.S. Pat. No. 4,945,428, issued on Jul. 31, 1990, and assigned to the assignee of the present invention, to show the management of an optical disk drive library.

The Pence patent, U.S. Pat. No. 4,876,662, issued on Oct. 24, 1989, and assigned to the assignee of the present invention, to show the management of data in a hierarchical storage system using a media library.

The Milligan et al. patent, U.S. Pat. No. 4,435,762, issued on Mar. 6, 1984, and assigned to the assignee of the present invention, to provide a description of the processing of the data on a tape media system.

The Rueger patent, U.S. Pat. No. 4,339,936, issued on Aug. 23, 1983, and assigned to the assignee of the present invention, to show a cartridge tape drive unit usable with the present invention.

The Richard patent, U.S. Pat. No. 4,452,406, issued on Jun. 5, 1984, and assigned to the assignee of the present invention, to show a cartridge tape media usable with the present invention.

FIELD OF THE INVENTION

The present invention relates generally to data storage and retrieval systems and, more particularly, to an improved method and apparatus for storing and retrieving data contained on cartridges in multi-cartridge library systems.

BACKGROUND OF THE INVENTION

In data processing installations, host processors generally have a relatively large plurality of peripheral data storage devices for storing data to be used in connection with host processor operations. Each host processor generally executes programs that allocate portions of the data storage space of the respective peripheral data storage device to various computer processes within the host processor. When the data processing environment grows to have an extremely large number of addressable data storage volumes which are mounted on a data storage unit, such as a magnetic or optical library system, the utilization of such data storage space and the accessing of such data storage space becomes extremely complicated. Libraries are often used in a hierarchical storage system with the volatile memory units, such as integrated circuit storage devices, being at the top of the hierarchy and the library systems being at the bottom.

Often times, duplicate copies of the same data are stored in different levels of the hierarchy in order to promote the rapid access of data by the host central processing units. The use of cache memories, for instance, permits the rapid access of often-used data by placing the most recently accessed data and the data in the immediate area to the most recently accessed data into the cache memory. This copy of the data stored in a lower level of the hierarchy, such as in a direct access storage device, or a magnetic tape storage device, or in a library system, is copied into a faster access memory store. The duplication of the data in different memory locations is often used for the protection of the data in the event one of the storage areas fails. Generally though, the duplication of the data in the different levels of the storage areas in the hierarchy is for the rapid access to the data in what could be inordinate periods of time for data retrieval which could complicate the retrieval of data and the operation of the entire data processing system.

Some applications of data processing systems require the storing and retrieving of such large amounts of information that many storage devices are required. In these applications, the user typically requires a hierarchy of storage that includes some combination of main memory and one or more types of peripheral storage devices. The goal of the hierarchy is to obtain moderately priced, high capacity storage while maintaining high speed access to the stored information. Hierarchical storage typically allows information to be transferred between main memory and one or more of the peripheral storage devices or between one or more peripheral storage devices and one or more other peripheral storage devices. Further storage is provided by maintaining libraries of data storage media, such as tapes, magnetic disks, or optical disks that can be mounted onto the existing peripheral devices.

In the retrieval of data from the lowest level in the hierarchy, the library system, the delay grows to seconds rather than fractions of seconds. When the data processing environment grows to have an extremely large number of addressable data storage volumes, which are mountable in a library storage unit, the utilization of such data storage space and the accessing of such data storage space becomes extremely complicated. Improvements to the retrieval of the stored data can result in the saving of much time.

Data storage in data processing environments typically is viewed as a hierarchy of storage levels. The first, or fastest, level is the level that communicates directly with the host processors in the data processing environment. The lower levels of the hierarchy, which may be up to six, seven or eight levels, add increasingly large data storage capacities, but have increasingly longer access times. The lower levels of the storage hierarchy are often characterized by a plurality of individually addressable data storage devices stored in library systems. It is desired to utilize these various addressable storage devices in an optimal manner for enhancing the overall operation of the data processing environment and, particularly, the data storage hierarchy.

In a library environment, a single section of data stored on a single media casing, whether cartridge or cassette or disk unit, is mountable and demountable from a drive unit. Even in an automated library, the access time to one volume of data is measured in seconds; hence, it is a relatively long time with respect to the time base of a data processing environment. Accordingly, it is desirous to minimize the time required for access to a single media unit of data. It is likewise desirous to increase the efficiency of the retrieval of data stored in the volumes for operating the data storage hierarchy and, hence, the data processing system in a more efficient manner.

It is, therefore, an object of the present invention to provide an enhanced library storage subsystem and a method of operating the enhanced library storage subsystem.

It is another object of the present invention to provide a management of media units in a library system and the storage of data in each media unit in a manner which enhances the retrieval of data from the library system.

Yet another object of the present invention is to provide an apparatus and a method of operating a library system that improves the response time for retrieving data information stored in cartridges in the library system.

SUMMARY OF THE INVENTION

In accordance with the present invention, a method is disclosed for improving access time in an automated storage library by creating multiple copies of data on different recording media, with different arrangements of the data on each recording medium. When retrieving data, a machine implemented process makes the decision as to which recording medium to utilize so as to minimize access time to the data records stored on the medium. The shortest time to access is used taking into account the time to retrieve the media casing and the time to access the data on the media, as well as the availability of the media drive and the media retrieval mechanism.

Access time is improved in an automated library system, especially in a library system having sequentially stored data on a recording medium, by creating a multiplicity of copies of the data stored on different units of the recording media. The data is stored at different locations on each recording medium unit. A library controller, independent of any user control, creates, manages, and deletes the multiple media copies according to the number of times the data is retrieved or the desires of the user. Full units of data on a single recording medium, generally, are the units that are copied. Copies can be a total duplicate of the original volume of data, or the individual sections of the data in the volume can be shifted in position on each unit. Shifting differences are controlled by the controller. The number of copies can be selected. The residence time of the multiple copies, as well as the number of access times of the data, is determined to select the optimum number of copies required and to reduce unnecessary copies when accesses to the data decrease. The controller selects the unit of the recording medium that can be retrieved in the shortest response time. The location of the unit, the drive availability, the robot availability for the recording medium, and the queues for the unit are checked.

A library data storage system generally includes a plurality of unit casings, either cartridges or cassettes, stored in a library unit storage subsystem. A robot means retrieves the unit cartridges from the data storage subsystem. A drive means for the unit cartridges, at least, is used for retrieving the data from the unit cartridges. A managing controller manages the data storage of the storage system. The improvement in the present invention includes a multiple virtual cartridge controller for creating, managing, and deleting multiple copies of the data of each unit cartridge. An administrator, under control of the multiple virtual cartridge controller, selects whether one or more copies of the data in one unit cartridge are to be automatically copied at any selected data end and selects whether one or more duplicate copies or data shifted copies are to be made. The administrator also selects the amount of data shift for any data shifted copies. The administrator also selects the resident time for the duplicated copies and selects the copies that are to be deleted at the end of the selected residence time. A log data accumulator, under control of the multiple virtual cartridge controller, maintains a data log of the usage for each of the data stored in one unit cartridge and in the copies made under control of the administrator means. A unit cartridge catalog, under control of the multiple virtual cartridge controller, maintains a listing of all data and unit cartridges stored in the library storage subsystem. A logic function, also under the control of the cartridge controller, receives the requests for data from the managing controller and selects the unit cartridge from which the data may be retrieved in the shortest amount of time. The logic function uses the location of each unit cartridge, the availability of the drive means, the location and availability of the robot means, the position of the data on the media, and any queues already in place in determining the shortest time.

In the machine implemented method of controlling a library system, the first step is to determine whether only full cartridges are to be automatically copied under control of the library controller, or if copies are only to be made at an operator request. The next step is to determine whether the copy should be a duplicated copy, an identical copy to the original copy, or a shifted copy. The shifted copy has the same contents, but shifts the location on the media. The next step is to select the amount of shifting of the data. The next step is to determine the number of copies required to meet the response time desired. Then the residence time of the copies is determined. After the residence time of the copies has been passed, the next step is to determine whether the automatic delete should be overridden by a use pattern. If automatic delete is requested, then the data is deleted after the passing of the selected residence time. If the automatic delete is to be overridden by the use pattern, the use pattern data preempts the automatic deletion.

BRIEF DESCRIPTION OF THE DRAWING

The various novel features of this invention, along with the foregoing and other objects, as well as the invention itself, both as to its organization and method of operation, may be more fully understood from the following description of illustrated embodiments when read in conjunction with the accompanying drawings wherein.

DESCRIPTION OF THE PREFERRED EMBODIMENT

Access time is improved in an automated library system having sequentially stored data on a recording medium by creating a multiplicity of copies of the data stored on different units of the recording medium with the data stored at different locations on each separate unit. Generally, only full volume units are copied. Copies can be a total duplicate or the data can be shifted.

The shifting differences can be controlled together with the number of copies and the residence time of the multiple copies. Each can be determined according to the times the data is retrieved. The number of copies can be selected according to the frequency of use of the data and the residence time of the multiple copies can continue so long as the frequency of use of the data continues. The recording media unit containing the data that can be retrieved in the shortest response time amongst all of the units containing that data is the recording media unit that is retrieved.

Figure 1:
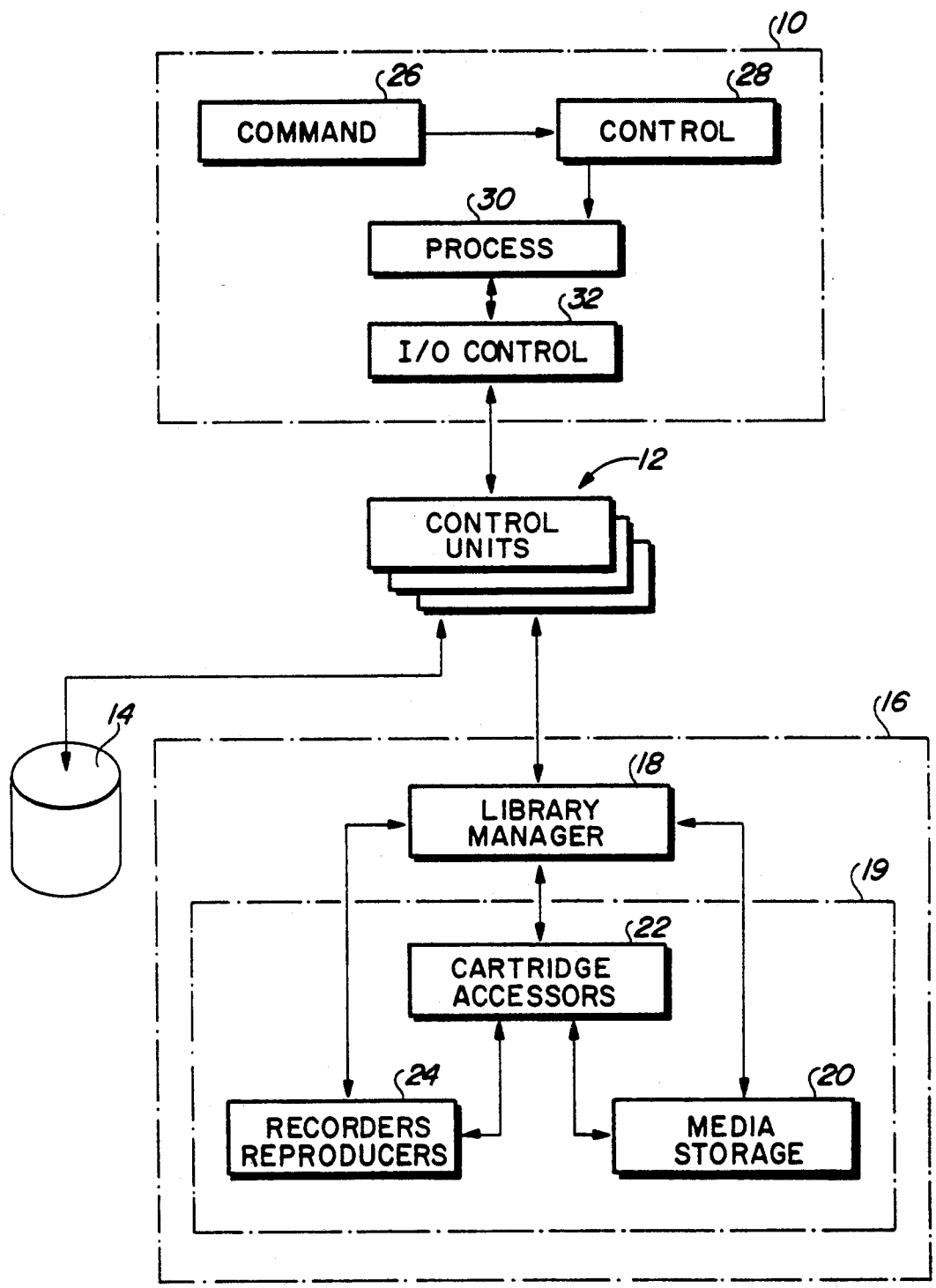
FIG. 1 is a simplified block diagram of a data processing environment which includes a data storage hierarchy useful with the present invention.

Referring now more particularly to the drawing, like reference numerals denote like features and structural elements in the various figures. A data processing environment, as shown in FIG. 1, includes one or more host processors 10 having a set of peripheral subsystems, many of which can be data storage subsystems. The data storage systems include a plurality of control units 12, as is well known. Attached to some of the control units is a direct access storage device (DASD) 14. The DASD device 14 may constitute a primary peripheral data storage level of the data storage hierarchy and generally is a plurality of the DASD units. Another of the peripheral subsystems include at least one media library 16, each of which is adapted to receive removable media. The media library 16 of the present invention is one that uses sequentially recorded data on a media which can include magnetic tape devices, magnetic disk devices with spiral recorded removable media, and optical disk drives, again with spirally recorded removable media. The media library 16 may be any automated library of known design. Such an automatic library can include the IBM 3850 Mass Storage Subsystem (MSS) which has tape cartridges mountable on recorders/reproducers for providing data communication between the volumes of data stored in each cartridge and the control units 12. The media library system 16 may also be an optical disk library as discussed in the aforementioned Harding et al., and Waldo patents.

Each host processor 10 includes complex electronic circuits and computer programs for computation and data processing system control. Such program may be an IBM program product called Data Facility/-Hierarchical Storage Manager (DFHSM) providing for migration and backup of data storage from a primary level of peripheral devices to a secondary level. The secondary level is the media library 20, as shown in FIG. 1. The DFHSM program product sends messages to the media library 16 for the retrieval of the data from media units stored in the media library 16.

Program modules are included, as shown in FIG. 1, in a library manager 18 of the library 16 for incorporating the practice of the present invention. The library manager 18 controls the operation of the library 16 by controlling the retrieval of data. The library manages a library device 19 which includes managing the operation of one or more media storage units 20, the accessing of cartridges by one or more cartridge accessor units 22, and the reading and writing of data onto the media in one or more recorder/reproducer units 24, all included as part of the library device.

Automated storage libraries, such as the library 16, improve the access time to the information stored on the media units contained therein by automatically managing the storage of the data onto the media units in the library device 19 through the library manager 18. Automated storage library devices 19 include a plurality of storage cells placed in the media storage unit 20 for storing the resident data storage medium. The library device 19 includes a robotic picker mechanism of the cartridge accessor 22 controlled by the library manager 18 to retrieve and to store the media units from the media storage 20. Each media unit includes the tape or the disk media contained in a casing, such as a cassette or cartridge housed for easy handling by the robot picker mechanism. The robot picker mechanism operates on command to transfer a data storage media unit between the media storage 20 and the recorders/reproducers 24 of the library device 19. The robot picker mechanism operates much faster than manual transfers of the storage media unit.

A command module 26 in the host processor 10 is a program task which receives software commands from other programs, such as the DFHSM program in the host processor 10. Such commands are decoded and transferred to a control task module 28. The control task module 28 implements the logic for determining when data is to be retrieved from the media library 16, for instance, for determining the data to be retrieved from the media unit. The data to be retrieved is processed in a process module 30 and directed out to an I/O control module 32 to the control unit 12. The control unit 12, in turn, passes the request to the media library 16, for instance. The library manager 18 of the library 16 uses the requests to determine the control of the media and the copies required, according to the present invention.

Figure 2:
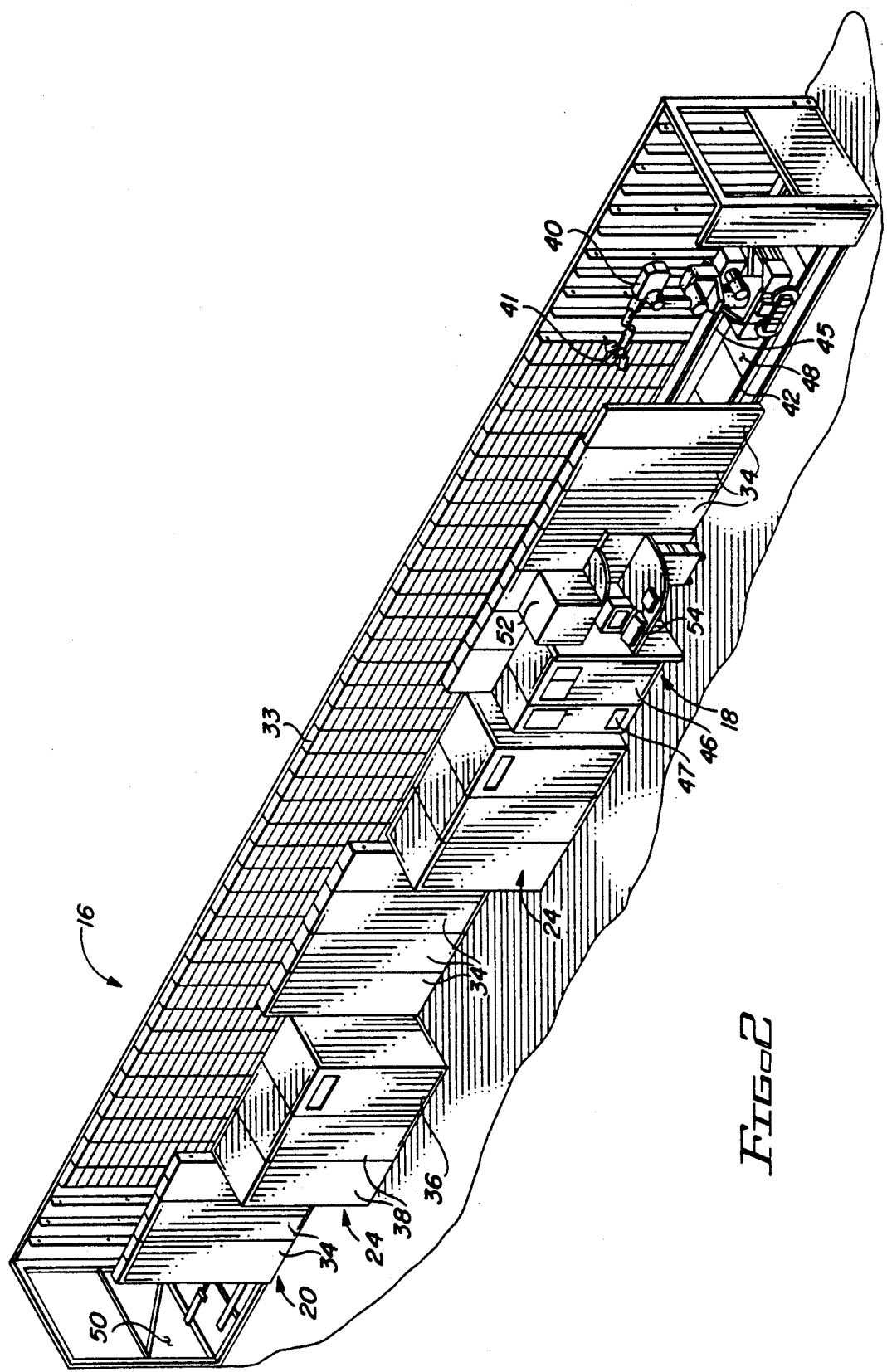
FIG. 2 is a perspective view of an automated library storage subsystem useful with the hierarchy of FIG 1.

FIG. 2 shows an automated form of a cartridge library which is usable as the media library 16 of FIG. 1. It should be evident that many different types of media may be stored in the library 16, such as spiral recorded optical disks and magnetic disks, as well as magnetic tapes stored in any type of casing, such as cassettes or cartridges. In the embodiment, as shown in FIG. 2, individual spools of magnetic tape are housed in plastic cartridges for protecting the magnetic tape and providing a convenient handling mechanism for the automated retrieval of the cartridges. The magnetic tape may be stored in a cartridge of the type shown in the aforementioned Richard patent. The library 16 of FIG. 2 includes the media storage 20, shown as a plurality of modules 34, each having a plurality of magazine holders (not shown). Each magazine holder in the module 34 includes a plurality of storage slots 33, for example, ten, and each storage slot stores a magnetic tape cartridge therein. The library 16 also includes several recorder/-reproducer units 24, each of which could be, for example, an IBM 3490 magnetic tape system having a tape controller 36 and tape drives 38. An example of a tape drive usable as the tape drive 38, is shown in the aforementioned Rueger patent. The operation of the controller 36 and the tape drives 38 is discussed in the aforementioned Milligan et al patent.

In the cartridge library 16 of FIG. 2, the cartridge accessor 22 of FIG. 1 includes a robot 40, having a gripper/vision assembly 41 attached thereto, which travels on an outrigger rail 42 and a guide rail 45 to transfer tape cartridges between the storage slots 33 and the tape drives 38. A robot controller 46 and a library controller 47, both part of the library manager 18 of FIG. 1, controls the commands directed to the robot 40 and the operation of the recorders/reproducers 24. A service bay 48 for the robot 40 is located at one end of the cartridge library 16. The service bay 48 functions as a parking space for the robot 40 when it is not in use or when it is being serviced. An operator access bay 50 is provided at the other end of the cartridge library 16 to allow service personnel to enter the system. A remote terminal bay 52, accessible internally by the service personnel, is attached to the cartridge library 16. Library management and control of the library manager 18 of FIG. 1 is available through a computer 54. The library manager 18 through the computer 54 permits an operator to determine system status, to promote a tape cartridge status and, generally, to enter external instructions into the cartridge library system 16.

The library manager 18 instructs the robot 40 to identify the tape cartridges and to move them to the tape drives 38 for either writing data information onto the tape media or retrieving the data already stored onto the tape media, under control of the library manager 18. The library device 19 of FIG. 1 includes: the media storage 20, the modules 34 and storage slots 33; the cartridge accessors 22, the robot 40; and the recorders/-reproducers 24, the tape controller 36, and the tape drives 38.

The improved response time provided by automated storage libraries has made it feasible to store a large number of images as a data type for computer processing. Such images include engineering drawings, financial and insurance documents, medical charts and records, voice data, etc. These images are known as objects in order to identify them as data elements having an unconventional data structure. Text, a conventional data structure, is encoded on a storage medium in streams of binary ones and zeros of fixed lengths. An object, on the other hand, is a named stream of binary ones and zeros of a known length which may or may not be encoded. The length of the stream of bits is not fixed, but may vary from a few bytes to several megabytes.

Optical disks provide the highest areal density of the storage media; hence an automated optical library is most suitable for storing large object data bases. Tape media provides the highest volumetric density storage media at a much lower cost per media unit. Hundreds of millions of objects can be stored in an automated library system. Efficient management is a necessity given the large number of objects handled. Object management software provides that management. Object access method software (OAM), a subcomponent of an IBM program product, Multiple Virtual Storage/Data Facility Product software (MVS/DFP), is object management software for managing the hundreds of millions of objects. OAM keeps an inventory of each object including its location information in an OAM object library. Library control system (LCS) is a subcomponent of OAM for processing a variety of requests affecting the media units in the library. Processing the requests requires that the corresponding media unit be mounted on a drive.

The LCS also performs object requests which are requests to perform an operation on a media unit. Object requests includes requests to read, write, or delete data from a media unit. Write requests further include specific and nonspecific write requests. A specific write request identifies a specific media unit to be written to.

In an IBM MVS/ESA IMAGEPLUS software environment, each object stored by LCS on a media unit contains compressed image data representing an electronically scanned document of one or more pages. A user request to display a document causes the LCS to read the appropriate object from a media unit. Typically, there are hundreds or thousands of interactive users at individual work stations wherein document requests may be issued. As a result, a large number of read requests may be pending in the LCS to read data from a large number of the media units. These media units may be currently mounted in a drive or may be currently stored in the storage library. Retrieving the data from the stored volume in the fastest amount of time is an object of the present invention.

Figure 3:
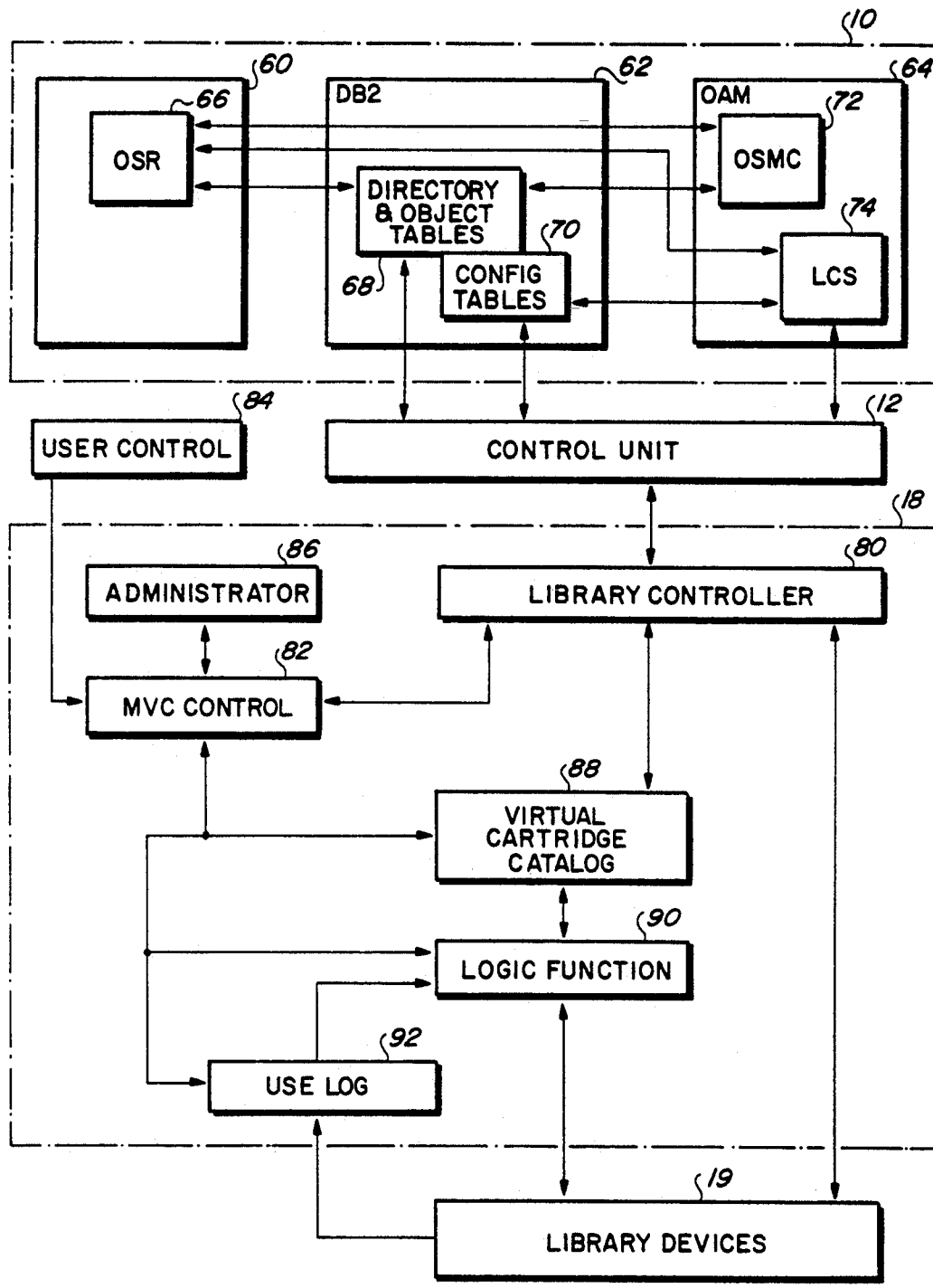
FIG. 3 is a block diagram of a data processing system managing cartridges in an automated library storage system using the present invention.

FIG. 3 shows a block diagram of the organization of the key components of the IMAGEPLUS system and using the present invention. The control unit 12 includes an application interface 60, a database unit (DB2) 62, and an object access method unit (OAM) 64. Application interface 60 is typically a workstation server which has the capability of sending and receiving scanned documents (objects) and interfacing to DB2 62 and OAM 64 via object storage and retrieval (OSR) 66.

The OSR 66 provides an application program for storing, retrieving, and deleting individual objects. The OSR 66 also maintains information about the objects in the DB2 62 including object name, size, location, creation date, last reference date, etc. The DB2 62 and the OAM 64 programs are stored in the host computer 10 as part of a MVS/DFP operating system. The DB2 includes directory and object tables 68 and configuration tables 70 which are connected to the OSR 66 for the storing of the object information.

The OAM 64 includes an OAM storage management component (OSCM) 72 and a library control system (LCS) 74. The OSCM 72 is connected to the LCS 74, to the OCR 66, and to the directory and objects tables 68. The function of the OSCM 72 is to manage an inventory of the many objects within the library system based on a specified storage management policy. The OSCM 72 management includes determining where objects are to be stored, moving objects within the storage hierarchy, managing object backup, and determining object expiration. The LCS 74 is connected to the OSR 66, the configuration tables 70, and to the library manager 18. The LCS 74 reads and writes the objects to the library storage media, manages the volumes of the media that store the objects, and instructs a library controller 80 of the library manager 18.

The library manager 18 communicates via the OAM library management software of the OAM 64. The OAM 64 maintains the DB2 database of object names. The multiple virtual cartridge concept of the present invention is shown in an MVC controller 82. The operation of the MVC controller 82 is described in FIG. 3.

As shown in FIG. 3, the MVC controller, under the control of the library controller 80 and a user control unit 84, manages the operation of an administrator unit 86, a virtual cartridge catalog 88, a logic function 90, and a use log unit 92. The library devices store the media cartridges, some of which are the multiple virtual cartridges of the present invention. The multiple virtual cartridges are library working media units which can preferably only be created from volumes of the data that are full. Once a volume is declared full by the library controller 80, no additional user data is written to that media unit volume. The MVC controller 80 issues the commands to create, delete, and manage the copies, the multiple volume cartridges (MVC), entirely independent of the library controller 80. This is all done under the control of the administrator unit 86. Only the host central processing unit has the authority to migrate or delete the original media unit. Only the MVC controller has the knowledge of and the ability to delete or change the multiple virtual cartridges. The multiple virtual cartridges exist in a closed environment within the library 16.

The MVC controller 82 creates, manages, and deletes the multiple virtual cartridges under control of the administrator unit 86 with the information supplied by the data collected in the use log unit 92. The specific user application and the customer specific use pattern determines the appropriate inputs to the use log 92 and the administrator 86.

The method of controlling the library controller starts with the question of whether all full volume media units will be automatically copied under the control of the library controller. If yes, then the process continues to determine the type of the copy. If the automatic creation of a copy is not desired, the flow moves through the block wherein copies are made only under the control of the operator through the user control unit 84.

After a copy has been requested, the next step is the decision of whether the copy should be a duplicated copy or a shifted copy. A duplicate copy is an identical copy to the original media unit volume with respect to both the content of the data and the location of the data onto the media unit. A shifted copy has the same content, but the location of the data on the media itself is shifted in the copy. That is, data that is located near the end of the media in one media unit, the original, for instance, may be located near the beginning of the tape in a multiple virtual cartridge copy. In any other copy required, the shifting can be done differently in each of the copies. The amount of shifting required is controlled in the next step. One copy could have the data at the beginning of the tape wherein the copy in the multiple virtual cartridge, the data may be located near the middle of the tape. The amount of shift could be also determined according to the number of copies made. Thus, if two copies are made, the data in the first half of the original volume may be shifted to the second half of the copied volume. Then, for instance, if four copies are to be made, the data in the first one-fourth of the original media unit can be shifted in the three copies over one-fourth of the tape length, respectively, in each of the subsequent copies. The number of copies are selected by the use log unit 92 according to the use criteria collected by the use log unit 92 from the library devices 19.

The resident time is selected next. The resident time selection determines when the multiple virtual cartridge will be automatically deleted unless overridden by the use pattern as discussed in the following step. The residence time is measured from the date of the creation of the multiple virtual cartridge. The residence time must be specified if the copies are created only by operator request through the user control unit 84. If the residence time has been reached, the multiple virtual cartridge will be deleted. If there is an override to the automatic deletion, as determined by the use pattern of the use log data as collected by the use log unit 92, the automatic delete function will be preempted by the use pattern data which may indicate a continued heavy use of this copy or of the data in the copies. The life of the multiple virtual cartridge can be extended by a predetermined amount of any length as desired.

The use log data will be maintained for each media unit. The output from the use log unit is used as an input to the logic function unit 90, as an override criteria for the multiple volume cartridge automatic delete administrator function, or as a library management function for the media unit end-of-life based on the usage of the data. Items that could be accumulated by the use log unit 92 by sensing the identifying mark of each media unit as the media unit is handled in the library devices 19, can be the number of mounts per day, the number of mounts per thirty-day running average in order to determine an automatic delete override, the number of object reads per day, the number of objects read in a thirty-day average, the date that the multiple virtual cartridge was created, the number of mounts since creation of the multiple virtual cartridge, the number of object reads since the creation, the number of versions this physical cartridge has served as a multiple virtual cartridge, the total number of cartridge mounts of all copies of the data, and the total number of objects read from each media unit of all types.

The multiple virtual cartridge catalog 88 is an OAM database that maintains a listing of all objects in the library and provides a mapping of object names to the identifier of the media unit and the sector location pointer. When a request to mount a specific media unit arrives at the library controller 80 from the OAM database 64, the library controller 80 first consults the multiple virtual cartridge catalog 88 to identify all cartridges that will supply the desired data. This information is directed to the logic function 90 which performs the computations to determine which cartridge to actually mount, which cartridge can be retrieved, and the cartridge from which the data can be read in the shortest amount of time. The object name read is matched to the object name requested and then forwarded to the operator who requested the data. The object may actually come from the original cartridge or from any one of the multiple virtual cartridges, this information is unknown to the host central processing unit. Data kept in the virtual cartridge catalog 88 includes the identifier of the data and a parameter, such as the block identifier, that provides information about how far from the beginning of the tape that the specific data is located. This information is used by the logic function module 90 to calculate an estimated response time and, hence, selects the cartridge that has the smallest access time to the data for the data read retrieval.

It is the purpose of the logic function module 90 to select the cartridge from which the data will be retrieved in the shortest response time. The information obtained from the multiple virtual cartridge catalog unit 88 is one of the inputs. Additional inputs required are; the location of the cartridge, the read requests queued for a mounted cartridge, the drive availability, and the robot availability. The drive availability is the queued request based on all drives that are presently occupied. The robot availability is the queued request based on the robots that are presently occupied. These inputs, coupled with the values of the drive characteristics, such as the tape search velocity, the cartridge mount time, and the robot load and unload cycle times, are used to estimate the response time for each of the cartridge options. The shortest response time option will then be chosen and the request fulfilled.

As shown in the present invention, the use of the multiple cartridge copies in a tape media library can achieve improved response time. For a number of applications, it is much more cost effective to use the multiple volume cartridge control of the present invention than to incorporate additional drives for the purpose of improving the average response time.

The principles of the present invention have now been made clear in an illustrated embodiment. There will be, immediately obvious to those skilled in the art, many modifications of structure, arrangement, proportion, the elements, materials, and components used in the practice of the invention. For instance, any type of sequentially stored data on any type of recording medium is usable in the present invention. A spiral recording on a magnetic or optical disk is an example of a sequentially stored data system like a tape media system. Further, although the IBM 3490 type tape cartridge is shown in the preferred embodiment, it should be evident that other types of tape cassettes and tape cartridges and other types of library systems are equally usable with the present invention. The appended claims are, therefore, intended to cover and embrace any such modification, within the limits only of the true spirit and scope of the invention.

What is claimed is:

1. In a library data storage system including a plurality of unit cartridges containing storage media stored in a library unit storage subsystem, a picker means for retrieving the unit cartridges from the storage subsystem, a recorder/reproducer means for at least retrieving data from the storage media of the unit cartridges, and a managing controller for managing the data stored on the media in the unit cartridges in the storage system, the improvement comprising:
   a multiple virtual cartridge controller (MVCC) for creating, managing and deleting multiple copies of data of each unit cartridge;
   an administrator under control of said MVCC to select whether one or more copies of the data in one unit cartridge are to be automatically copied at any selected data end, and to select whether one or more duplicated copies or data shifted copies are to be made;
   a log data accumulator under control of said MVCC for maintaining a use pattern indication criteria of each copy of the data stored on the media in the plurality of unit cartridges;
   a unit cartridge catalog under control of said MVCC for maintaining a listing of all data and unit cartridges stored in the library storage subsystem; and
   a logic function under control of said MVCC for receiving a request for data from the managing controller for selecting the unit cartridges from which the data is retrieved in the shortest period of time using the storage location of each unit cartridge, recorder/reproducer means availability, picker means location and availability, and any queues already in place for the data requested.

2. In a library data storage system as defined in claim 1 wherein said administrator selects the amount of data shift on the media copies for data shifted copies and wherein said logic function also uses the position of the data as a result of the amount of data shift on the media copies in order to determine the shortest retrieval time for the requested data.

3. In a library data storage system as defined in claim 1 wherein said administrator selects the residence time for the duplicated copies and deletes the copies at the end of the selected residence time.

4. In a library data storage system as defined in claim 3 wherein said MVCC overrides the deletion of the copies according to the use pattern indication criteria collected by the use log accumulator.

5. A data storage system comprising:
   a library unit storage subsystem;
   a plurality of unit cartridges containing storage media stored in said library unit storage subsystem;
   a picker means for retrieving the unit cartridges from the storage subsystem;
   a recorder/reproducer means for at least retrieving data from the unit cartridges;
   a managing controller for managing the data stored in the storage system;
   a multiple virtual cartridge controller (MVCC) for creating, managing and deleting multiple copies of data of each unit cartridge;
   an administrator under control of said MVCC to select whether one or more copies of the data in one unit cartridge are to be automatically copied at any selected data end, and to select whether one or more duplicated copies or data shifted copies are to be made;
   a log data accumulator under control of said MVCC for maintaining a use pattern indication criteria of each copy of the data stored on the media in the plurality of unit cartridges;
   a unit cartridge catalog under control of said MVCC for maintaining a listing of all data and unit cartridges stored in the library storage subsystem; and
   a logic function under control of said MVCC for receiving a request for data from the managing controller for selecting the unit cartridges from which the data is retrieved in the shortest period of time using the storage location of each unit cartridge, drive means availability, picker means location and availability, and any queues already in place for the data requested.

6. A data storage system as defined in claim 5 wherein said administrator selects the amount of data shift on the media copies for data shifted copies and wherein said logic function also uses the position of the data as a result of the amount of data shift on the media copies in order to determine the shortest retrieval time for the requested data.

7. A data storage system as defined in claim 5 wherein said administrator selects the residence time for the duplicated copies and deletes the copies at the end of the selected residence time.

8. In a library data storage system as defined in claim 7 wherein said MVCC overrides the deletion of the copies according to the use pattern indication criteria collected by the use log accumulator.

9. A data processing system comprising:
   at least one host central processor;
   at least one control unit connected to receive commands from said at least one host processor and to transmit data to at least one of said host processors;
   a library unit storage subsystem connected to at least one control unit;
   a plurality of unit cartridges containing media storage stored in said library unit storage subsystem;
   a picker means for retrieving the unit cartridges from the storage subsystem;
   a recorder/reproducer means for at least retrieving data from the media in said unit cartridges;
   a managing controller for managing the data stored on the media in the unit cartridges in the storage system;
   a multiple virtual cartridge controller (MVCC) for creating, managing and deleting multiple copies of data in each unit cartridge;

an administrator under control of said MVCC to select whether one or more copies of the data on the media in one unit cartridge are to be automatically copied at any selected data end, and to select whether one or more duplicated copies or data shifted copies are to be made;

a log data accumulator under control of said MVCC for maintaining a use pattern indication criteria of each copy of the data stored on the media in the plurality of unit cartridges;

a unit cartridge catalog under control of said MVCC for maintaining a listing of all data and unit cartridges stored in the library storage subsystem; and a logic function under control of said MVCC for receiving a request for data from the managing controller for selecting the unit cartridges from which the data is retrieved in the shortest period of time using the storage location of each unit cartridge, recorder/reproducer means availability, picker means location and availability, and any queues already in place for the data requested;

said library controller transmitting the retrieved data for use by said host processor.

10. A data processing system as defined in claim 9 wherein said administrator selects the amount of data shift on the media copies for data shifted copies and wherein said logic function also uses the storage placement of the data to be retrieved on the media in each unit cartridge in order to determine the shortest retrieval time for the requested data.

11. A data processing system as defined in claim 9 wherein said administrator selects the residence time for the duplicated copies and deletes the copies at the end of the selected residence time.

12. A data processing system as defined in claim 11 wherein said MVCC overrides the deletion of the copies according to the use pattern indication criteria collected by the use log accumulator.

13. A library management system for controlling the accessing of data from a plurality of unit cartridges containing the data stored on storage media in the cartridges and stored in a library storage device, said library management system comprising:

a multiple virtual cartridge controller (MVCC) means for creating, managing and deleting multiple copies of data of each unit cartridge;

an administrator means under control of said MVCC means for selecting whether one or more copies of the data in one unit cartridge are to be automatically copied at any selected data end, for selecting whether one or more duplicated copies or data shifted copies are to be made, for selecting the residence time for the duplicated copies, and for deleting the copies at the end of the selected residence time;

a log data accumulator means under control of said MVCC for maintaining a use pattern indication criteria of each copy of the data stored on the media in the plurality of unit cartridges;

a unit cartridge catalog means under control of said MVCC means for maintaining a listing of all data and unit cartridges stored in the library storage subsystem; and a logic function means under control of said MVCC means for receiving a request for data from the managing controller for selecting the unit cartridges from which the data may be retrieved in the shortest period of time using the storage location of each unit cartridge, recorder/reproducer means availability in the library devices, picker means location and availability in the library devices, and any queues already in place for the data requested.

14. A library management system as defined in claim 13 wherein said administrator means selects the amount of data shift on the media copies for data shifted copies and wherein said logic function means also uses the position of the data as a result of the amount of data shift on the media copies in order to determine the shortest retrieval time for the requested data.

15. A library management system as defined in claim 13 wherein said administrator selects the residence time for the duplicated copies and deletes the copies at the end of the selected residence time.

16. A library management system as defined in claim 15 wherein said MVCC overrides the deletion of the copies according to the use pattern indication criteria collected by the use log accumulator.

17. A machine implemented method for managing a library storage system containing media storage in a unit cartridge comprising the steps of:

maintaining a use pattern indication criteria of each copy of the data stored on the media in the plurality of unit cartridges;

determining whether data on the media stored in the unit cartridge is to be automatically copied when full according to the use pattern maintained;

creating copies of the data on the media under control of an operator if the data stored on the media is not to be automatically copied;

creating copies of the data on the media by the library storage system if the data stored on the media is to be automatically copied;

determining whether a duplicated copy or a shifted copy of the data on the media is to be made;

selecting the number of copies to be made according to the use pattern criteria maintained of the data on the media;

determining the resident time for the number of copies selected; and deleting the copies of the data on the media after the determined resident time has passed.

18. In a machine implemented method as defined in claim 17 further including the step of shifting of the data into different areas of the media on the copies after the step of determining whether a duplicated copy or a shifted copy is to be made and a shifted copy is determined.

19. In a machine implemented method as defined in claim 17 further including the step of overriding the step of deleting the copies if the use pattern criteria maintained of the copies indicates a continued heavy use of the copies of the data.

20. In a machine implemented method as defined in claim 17 wherein the step of maintaining a use pattern indication uses the number of requests of the cartridge containing the data and the date that the multiple copies of the data was made as the pattern criteria.

21. An automated storage library having a machine executed ability for selecting a unit cartridge containing a required data from a plurality of unit cartridges containing the same data, said library comprising:

means for selecting the unit cartridges in the library;

means for at least retrieving data from the unit cartridge selected by said selecting means;

means for creating multiple copies of data of any unit cartridge;

means for determining whether one or more copies of the data are to be made and wherein said creating means creates data shifted copies of the data of the unit cartridge selected for copying; and means for receiving a request for the required data and responsive thereto to activate said selecting means to select the unit cartridge from the multiple copies of unit cartridges having the required data that is retrieved in the shortest period of time using the storage location of each copy, the availability of said at least data retrieving means, the location and availability of said selecting means, and any queues already in place for the data requested.

22. An automated storage library as defined in claim 21 further including means for maintaining a use pattern indication criteria of each copy of the required data stored in each unit cartridge.

23. An automated storage library as defined in claim 21 further including catalog means for maintaining a listing of all data and unit cartridges stored in the library.

24. An automated storage library as defined in claim 21 wherein said creating means creates duplicated copies of the data of a unit cartridge.

25. An automated storage library as defined in claim 21 further including means for selecting a residence time for the multiple copies created by said creating means.

26. An automated storage library as defined in claim 21 wherein said receiving means receives the request for the required data and is responsive thereto to activate said selecting means to select the unit cartridge from the multiple copies of unit cartridges having the required data based also on the storage placement of the data in the copies of the unit cartridges.

27. An automated storage library as defined in claim 21 further including means for selecting a residence time for the multiple copies and means for deleting any copies at the end of the residence time.

28. An automated storage library as defined in claim 27 further including means for maintaining a use pattern indication criteria of each copy of the required data stored in each unit cartridge and wherein said deleting means is disabled according to the use pattern indication criteria collected by said maintaining means.

* * * * *

UNITED STATES PATENT AND TRADEMARK OFFICE
CERTIFICATE OF CORRECTION

PATENT NO. : 5,287,459

DATED : February 15, 1994

INVENTOR(S) : John J. Gniewek

It is certified that error appears in the above-identified patent and that said Letters Patent is hereby corrected as shown below:

At column 13, lines 27, 28 and 29, delete "storage placement of the data to be retrieved on the media in each unit cartridge" and substitute --position of the data as a result of the amount of data shift on the media copies--.

Signed and Sealed this

Nineteenth Day of July, 1994

Attest:

BRUCE LEHMAN

Attesting Officer

Commissioner of Patents and Trademarks